(12) United States Patent
Juarez et al.

(10) Patent No.: US 11,953,122 B2
(45) Date of Patent: Apr. 9, 2024

(54) THREADFORM HAVING ENLARGED GROOVES

(71) Applicant: HYDRIL COMPANY, Houston, TX (US)

(72) Inventors: Alejandro Juarez, Cypress, TX (US); Nishikant V Raje, Houston, TX (US)

(73) Assignee: Hydril Company, Houston, TX (US)

( * ) Notice: Subject to any disclaimer, the term of this patent is extended or adjusted under 35 U.S.C. 154(b) by 253 days.

(21) Appl. No.: 16/728,727

(22) Filed: Dec. 27, 2019

(65) Prior Publication Data
US 2020/0208761 A1 Jul. 2, 2020

Related U.S. Application Data

(60) Provisional application No. 62/785,590, filed on Dec. 27, 2018.

(51) Int. Cl.
F16L 15/06 (2006.01)

(52) U.S. Cl.
CPC .................. F16L 15/06 (2013.01)

(58) Field of Classification Search
CPC ....... F16L 15/06; F16L 15/006; E21B 17/043; E21B 14/072; E21B 43/106
See application file for complete search history.

(56) References Cited

U.S. PATENT DOCUMENTS

| | | | |
|---|---|---|---|
| 7,585,002 B2* | 9/2009 | Curley | F16L 15/007 285/333 |
| 2004/0017081 A1* | 1/2004 | Simpson | E21B 43/106 285/333 |
| 2004/0069498 A1* | 4/2004 | Simpson | E21B 43/106 166/242.6 |
| 2004/0090068 A1* | 5/2004 | Evans | E21B 43/106 285/333 |
| 2004/0104575 A1* | 6/2004 | Ellington | E21B 43/106 285/333 |
| 2004/0113428 A1* | 6/2004 | Macaulay | E21B 43/106 285/333 |
| 2004/0228679 A1* | 11/2004 | Reavis | E21B 43/106 403/307 |
| 2004/0231839 A1* | 11/2004 | Ellington | E21B 43/106 166/207 |

(Continued)

Primary Examiner — David Bochna
(74) Attorney, Agent, or Firm — Morgan, Lewis & Bockius LLP

(57) ABSTRACT

A connection includes a first expandable tubular member having a first screw threadform defined by a first plurality of crests, roots, and flanks, where each flank separates each crest from each root. The connection also includes a second expandable tubular member having a second screw threadform defined by a second plurality of crests, roots, and flanks, where each flank separates each crest from each root. The crests and roots are substantially axial to the tubular members and the flanks are substantially radial to the tubular members. The first expandable tubular member and the second expandable tubular member are configured to connect when the first threadform engages with the second threadform. Clearances are formed between the first plurality of flanks and the second plurality of flanks when the first and second expandable tubular members connect.

8 Claims, 2 Drawing Sheets

(56) References Cited

U.S. PATENT DOCUMENTS

| | | | |
|---|---|---|---|
| 2006/0061098 A1* | 3/2006 | Hovem | E21B 17/042 285/333 |
| 2006/0087119 A1* | 4/2006 | Sivley | E21B 43/106 285/333 |
| 2010/0230958 A1* | 9/2010 | Holland | E21B 43/106 285/333 |

* cited by examiner

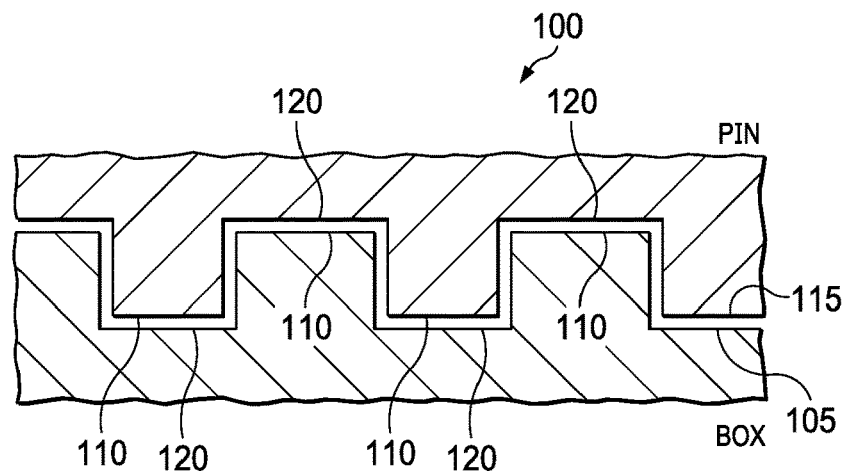
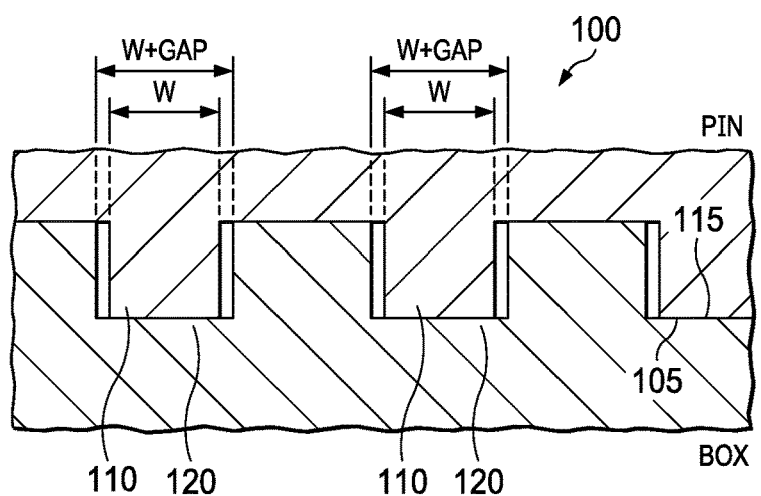
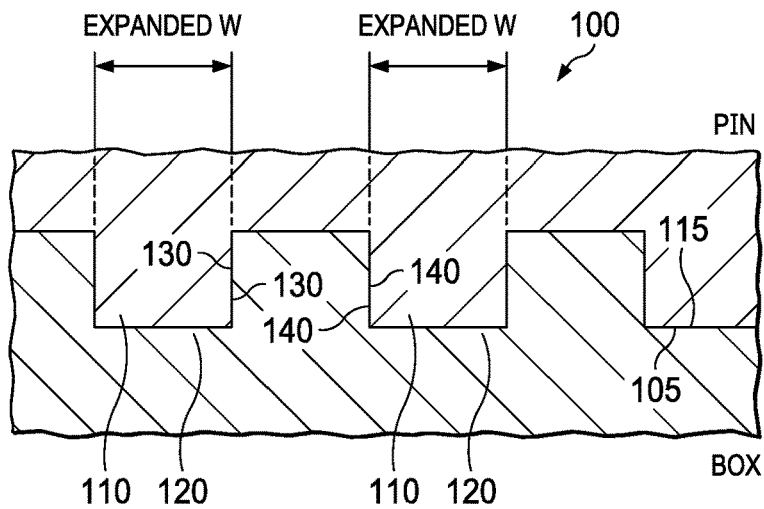

THREADFORM HAVING ENLARGED GROOVES

TECHNICAL FIELD

The present application relates to tubular connections, and more particularly, to a tubular member having a threaded connection with enlarged grooves to fit expandable interlocking threads.

BACKGROUND

This section is intended to introduce various aspects of art that may be related to various aspects of the present techniques, which are described and/or claimed below. This discussion is believed to be helpful in providing background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The oil and gas industry is drilling upstream production wells of increasing depth and complexity to find and produce raw hydrocarbons. The industry routinely uses steel pipe, considered an Oil Country Tubular Good (OCTG) to protect the borehole (i.e., casing) and to control the fluids produced within the pipe (i.e., tubing). Such pipes, including casing and tubing, are made and transported in relatively short segments and installed in the borehole one segment at a time, with each segment being connected to the next. As the search for oil and gas has driven companies to drill deeper wells, pipes may be subject to increased complexity and magnitude of forces throughout their lifespans downhole. Industry demands have grown for casing, tubing, and connectors having increased tensile and pressure strengths. Furthermore, the developing area of deviated and horizontal wells have exacerbated this trend, further adding increased torsional loads as another requirement for casing and tubing connectors.

In some wells, a specific type of casing called expandable casing or tubing may be used. This type of casing may be expanded radially to increase the inner and outer diameters. In one example, casing that is radially expandable may be used to reinforce damaged casing in cased holes. In open hole wells, a smaller casing may be used and expanded once it is downhole to reduce the required diameter of the drilled hole and reduce the cement needed to fix the casing in the wellbore. As an example, after expandable casing is deployed in a wellbore, a mandrel that has a larger outer diameter than the inner diameter of the casing may be pulled through the deployed casing. The larger outer diameter of the mandrel forces the casing to expand. Other methods of expansion may involve increasing pressure or heat to cause expansion of the casing.

When expandable pipe expands, the connection threads also generally expand. Because of the physical change to the threads, the operational characteristics of the connection also change, and the connection may be weaker and may not maintain the same pressure or sealability characteristics that it had before expansion.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

To address one or more of the issues described above, the threadform on expandable pipe should be designed to maintain or improve the connection strength, pressure rating, torque rating, and other performance characteristics when the pipe is expanded. In one embodiment, a connection includes a first expandable tubular member having a first screw threadform defined by a first plurality of crests, a first plurality of roots, and a first plurality of flanks, where each flank separates each crest from each root. The first plurality of crests and roots are substantially axial to the first expandable tubular member while the first plurality of flanks are substantially radial to the first expandable tubular member. The connection also includes a second expandable tubular member having a second screw threadform defined by a second plurality of crests, a second plurality of roots, and a second plurality of flanks, where each flank separates each crest from each root. The second plurality of crests and roots are substantially axial to the second expandable tubular member and the second plurality of flanks are substantially radial to the second expandable tubular member. The first expandable tubular member and the second expandable tubular member are configured to connect when the first threadform engages with the second threadform. Clearances are formed between the first plurality of flanks and the second plurality of flanks when the first and second expandable tubular members connect.

In another embodiment, a method includes moving a first expandable tubular member relative to a second expandable tubular member, such that a pin end of the first expandable tubular member enters and axially overlaps with a box end of the second expandable tubular member. The method further includes rotating the first expandable tubular member relative to the second expandable tubular member, such that a first threading on the first expandable tubular member engages with a second threading on the second expandable tubular member. The method then includes connecting the first expandable tubular member to the second expandable tubular member, such that a length of box threading of the box end substantially covers a length of pin threading of the pin end. The pin threading includes pin crests and pin roots that are substantially axial to the first expandable tubular member, where the pin crests and pin roots are each separated by pin flanks that are substantially radial to the first expandable tubular member. The box threading includes box crests and box roots that are substantially axial to the second expandable tubular member, where the box crests and box roots are each separated by box flanks that are substantially radial to the second expandable tubular member. An expansion space is formed between the pin flanks and box flanks once the first and second expandable tubular members are connected.

BRIEF DESCRIPTION OF THE DRAWINGS

Embodiments of the present techniques are described with reference to the following figures. The same numbers are used throughout the figures to reference like features and components. Various embodiments may utilize elements and/or components other than those illustrated in the drawings, and some elements and/or components may not be present in various embodiments. Elements and/or components in the figures are not necessarily drawn to scale.

FIG. 1 is a schematic view of ridges on a pin end and enlarged grooves on a box end prior to makeup and expansion, in accordance with embodiments of the present techniques;

FIG. 2 is a schematic view of ridges on a pin end and enlarged grooves on a box end after makeup and prior to expansion, in accordance with embodiments of the present techniques;

FIG. 3 is a schematic view of a made up and expanded connection, in accordance with embodiments of the present techniques;

DETAILED DESCRIPTION

Figure 4:
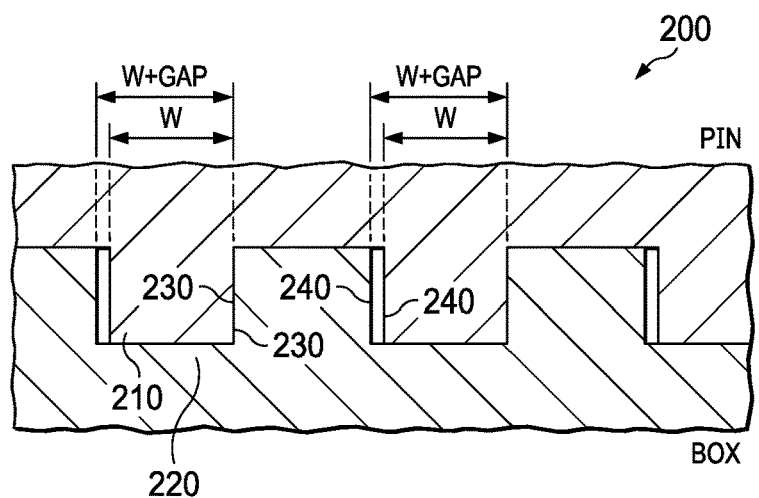
FIG. 4 is a schematic view of another embodiment of enlarged grooves on a box end after makeup and prior to expansion, in accordance with embodiments of the present techniques.

Tubular connectors generally include tubular segments that are connected when a tubular segment having a male threaded pin end is connected with another tubular segment having a female threaded box end. The pin and box are designed to be joined together such that the tubular segments are sealed to prevent the passage of liquid or gas across the threads of the assembled connection. The interlocking threads of the pin and box are designed such that the ridge segments (sometimes referred to as tooth segments) of a pin or box fit into a corresponding groove segment of a box or pin. The dimensions of each ridge and groove are manufactured for a precise fit to transport liquids and gases inside the assembled tubular connection. Expandable connections are designed to expand under certain conditions (e.g., applied heat, pressure, etc.) to a final expanded dimension. Typically, expandable connections radially expand to enlarge the inner and outer dimensions of the casing or tubing. When expandable connections expand, the threading of the connections also expand. The dimensions of the thread must be designed to maintain a precise fit once the connection expands.

One or more embodiments of the present disclosure involve connections with grooves having an enlarged gap relative to its corresponding ridge to contain an expanded ridge upon make up of the connection. The schematic diagram of FIG. 1 shows a partial profile of a connection threadform 100 that includes a pin and box, with each having two ridge segments 110 and two groove segments 120. The connection is in the process of being made up, where the thread roots 105 and crests 115 are not in contact. The depicted threadform 100 is a square or near-square form, though the present techniques may apply to any other threadform, such as wedge, dovetail, or buttress shapes. The box and pin threads include stab flanks and load flanks extending between the crests and roots. In an embodiment, the box grooves may have a wider width than the width of the corresponding pin ridge. In an embodiment, the pin grooves may also be correspondingly wider than the width of the box ridges. In one or more embodiments, the width of the pin grooves may differ from the width of the box grooves, and the width of the pin ridges may differ from the width of the box ridges. In an embodiment, the box ridge is wider than the pin ridge. In an embodiment, the box groove is wider than the pin groove.

FIG. 2 is a drawing of the pin and box of FIG. 1 after the connection threadform 100 is made up but before it is expanded. As shown, the crests 115 of the pin may contact the roots 105 of the box, but the stab flanks of the pins may not contact the load flanks of the box, since the box grooves 120 have been designed to be wider than the pin ridges 110 prior to expansion. In an embodiment, the thread roots 105 and crests 115 may not be in contact even after makeup. The enlarged or wider box grooves 120 may also be described as having a clearance, which may also be described as a gap, void, recess, space, area, etc., designed to provide relief for thread expansion. In FIG. 2, the width of the box grooves 120 is represented by "W+GAP" and the width of the pin ridges 110 is represented by "W." The width of the box grooves 120 or the clearance, may be designed to fit an estimated expansion of the ridges 110. When a connection is loaded, which may happen, for example, when two pipe segments are made up and one is pulling against the other (such as in a vertical borehole), gaps between the load flanks of the pin and box may close if the geometry of the threadform and connection allows. A feature such as a shoulder may prevent the axial movement of one pipe segment relative to another.

FIG. 3 is a schematic view of a made up and expanded connection 100, in accordance with embodiments of the present techniques. As noted above, when the connection is expanded, the ridges 110 and grooves 120 of the connection 100 may expand, shift, or otherwise change shape. Once the connection 100 has been expanded, the ridges 110 of the pin may fully expand into the grooves 120 of the box, such that the crests 115 of the pin touch the roots 105 of the box, the stab flanks 130 of the pins contact the stab flanks 130 of the box, and the load flanks 140 of the pin contact the load flanks 140 of the box. The precise fit of the expanded pin and box threads may allow the connection to maintain high performance criteria. Furthermore, designing clearance for thread expansion may reduce the likelihood of connection deformation, which may occur if thread ridges have no space to expand. In one or more embodiments, one or more of the stab flanks 130 of the pin and box, the load flanks 140 of the pin and box, or the crests 115 and roots 105 of the pin and box may not be in full contact even after expansion.

The present techniques may include other embodiments of enlarged grooves. For example, FIG. 4 is a schematic view of another embodiment 200 of enlarged grooves after makeup and prior to expansion, in accordance with embodiments of the present techniques. Similar to the schematic in FIG. 2, the grooves 220 of the box are wider than the ridges 210 of the pin by a gap distance. Unlike the embodiment of FIG. 2, the box grooves may be enlarged only on one side, such that the stab flanks 230 of the pin and box contact each other on makeup, but the load flanks 240 of the pin and box do not contact each other. As noted above, the gap, or axial separation, between the load flanks may be maintained even when the connection is loaded if the connection includes a feature like a shoulder that prevents axial movement of the pin and box relative to each other.

Figure 5:
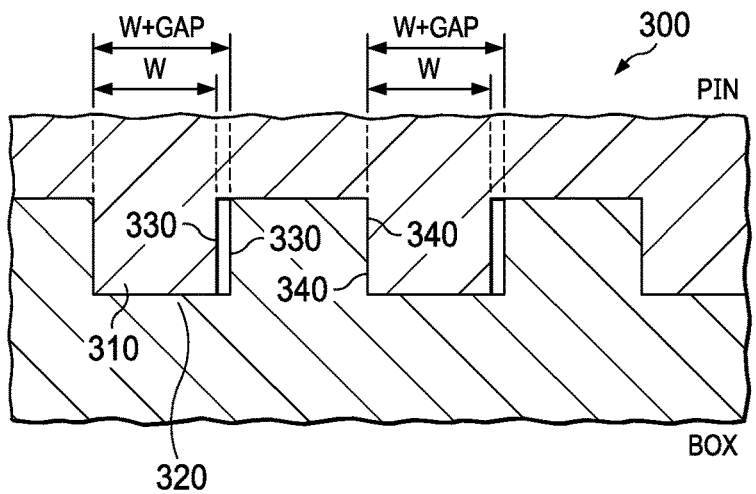
FIG. 5 is a schematic view of another embodiment of enlarged grooves on a box end after makeup and prior to expansion, in accordance with embodiments of the present techniques.

FIG. 5 is a schematic view of yet another embodiment 300 of enlarged grooves 320 (relative to ridges 310) on a box end after makeup and prior to expansion, in accordance with embodiments of the present techniques. As depicted in FIG. 5, the box grooves 320 may be enlarged on one side such that the load flanks 340 of the pin and the box contact each other, but the stab flanks 330 of the box do not contact each other.

Figure 6:
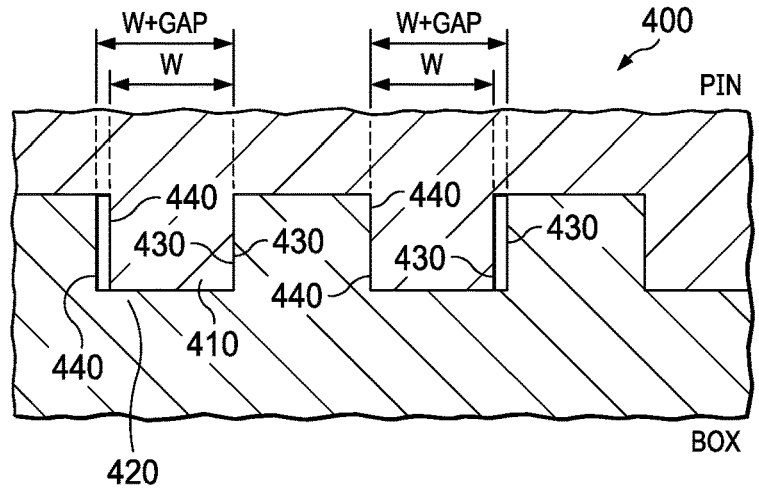
FIG. 6 is a schematic view of another embodiment of enlarged grooves on a box end after makeup and prior to expansion, in accordance with embodiments of the present techniques.

Finally, FIG. 6 is a schematic view of another embodiment 400 of enlarged grooves 420 (relative to ridges 410) on a box end after makeup and prior to expansion, in accordance with embodiments of the present techniques. The box grooves 420 may be enlarged in a varying way such that in the axial cross-sectional plane depicted in FIG. 6, there is a clearance between the load flanks 440 of the pin and the box in one groove 420, but no clearance between the load flanks 440 of the pin and the box in the next groove 420. Similarly, there is no clearance between the stab flanks 430 of the pin and the box in one groove 420, but there is clearance between the stab flanks 430 of the pin and the box in the next groove 420. Once the pin and box connections depicted in FIGS. 4-6 are expanded, the pin and box threads may be in full contact as depicted in FIG. 3. In one or more embodiments, the pin and box threads may not be in full contact even after expansion.

It should be appreciated that while the enlarged grooves have been described with respect to the box member, the enlarged grooves of the present disclosure are also anticipated in the pin member. In other words, the pin and box notations in FIGS. 1-6 may be reversed in accordance with the present techniques. Furthermore, in some embodiments, both the pin and box threads may be enlarged or widened to achieve the clearances depicted in FIGS. 1-6.

Many modifications and other implementations set forth herein will be apparent having the benefit of the teachings presented in the foregoing descriptions and the associated drawings. Therefore, it is to be understood that the systems and methods described herein are not to be limited to the specific implementations disclosed and that modifications and other implementations are intended to be included within the scope of the appended claims. Although specific terms are employed herein, they are used in a generic and descriptive sense and not for purposes of limitation.

The invention claimed is:

1. A connection comprising:
a first expandable tubular member comprising a first screw threadform defined by a first plurality of crests, a first plurality of roots, a first plurality of stab flanks, and a first plurality of load flanks, wherein the first plurality of crests and roots are substantially axial to the first expandable tubular member and the first plurality of stab and load flanks are substantially radial to the first expandable tubular member; and
a second expandable tubular member comprising a second screw threadform defined by a second plurality of crests, a second plurality of roots, a second plurality of stab flanks, and a second plurality of load flanks, wherein the second plurality of crests and roots are substantially axial to the second expandable tubular member and the second plurality of stab and load flanks are substantially radial to the second expandable tubular member,
wherein, upon engagement of the first threadform with the second threadform in a first position, the first expandable tubular member and the second expandable tubular member are configured to connect such that:
the first plurality of roots abuts the second plurality of crests,
the second plurality of roots abuts the first plurality of crests,
first clearances are formed between the first plurality of load flanks and the second plurality of load flanks, and
a first stab flank of the first plurality of stab flanks and a first load flank of the first plurality of load flanks define a first groove of the first expandable tubular member with a first clearance width, and a second stab flank of the first plurality of stab flanks and a second load flank of the first plurality of load flanks define a second groove of the first expandable tubular member with a second clearance width, and the first clearance width and the second clearance width are substantially similar.

2. The connection of claim 1, wherein second clearances are formed between the first and second plurality of stab flanks.

3. A method comprising:
moving a first expandable tubular member relative to a second expandable tubular member, such that a pin end of the first expandable tubular member enters and axially overlaps with a box end of the second expandable tubular member;
rotating the first expandable tubular member relative to the second expandable tubular member, such that a first threading on the first expandable tubular member engages with a second threading on the second expandable tubular member;
connecting the first expandable tubular member to the second expandable tubular member in a first position, such that a length of box threading of the box end substantially covers a length of pin threading of the pin end,
wherein the pin threading comprises pin crests and pin roots that are substantially axial to the first expandable tubular member, each separated by pin flanks that are substantially radial to the first expandable tubular member and the box threading comprises box crests and box roots that are substantially axial to the second expandable tubular member, each separated by box flanks that are substantially radial to the second expandable tubular member,
wherein an expansion space is formed between the pin flanks and box flanks once the first and second expandable tubular members are connected in the first position and a first pin flank and a second pin flank of the pin flanks define a first groove of the first expandable tubular member with a first clearance width, and a third pin flank and a fourth pin flank of the pin flanks define a second groove of the first expandable tubular member with a second clearance width, and the first clearance width and the second clearance width are substantially similar, and
wherein the pin crests abut the box roots and the pin roots abut the box crests; and
radially expanding the first expandable tubular member and second expandable tubular member to a second position, wherein the expansion space formed between the pin flanks and box flanks is axially narrower in the second position than in the first position.

4. The method of claim 3, wherein the expansion space formed between the pin flanks and box flanks is axially closed in the second position.

5. A connection comprising:
a first expandable tubular member comprising a first screw threadform defined by a first plurality of crests, a first plurality of roots, and a first plurality of flanks, wherein each flank separates each crest from each root, and wherein the first plurality of crests and roots are substantially axial to the first expandable tubular member and the first plurality of flanks are substantially radial to the first expandable tubular member; and a second expandable tubular member comprising a second screw threadform defined by a second plurality of crests, a second plurality of roots, and a second plurality of flanks, wherein each flank separates each crest from each root, and wherein the second plurality of crests and roots are substantially axial to the second expandable tubular member and the second plurality of flanks are substantially radial to the second expandable tubular member, wherein, upon engagement of the first threadform with the second threadform in a first position, the first expandable tubular member and the second expandable tubular member are configured to connect such that:

the first plurality of roots abuts the second plurality of crests, the second plurality of roots abuts the first plurality of crests, clearances are formed between the first plurality of flanks and the second plurality of flanks, and a first flank and a second flank of the first plurality of flanks define a first groove of the first expandable tubular member with a first clearance width, and a third flank and a fourth flank of the first plurality of flanks define a second groove of the first expandable tubular member with a second clearance width, and the first clearance width and the second clearance width are substantially similar; and wherein the first expandable tubular member and the second expandable tubular member are configured to radially expand to a second position; and wherein the clearances are axially narrower in the second position than in the first position.

6. The connection of claim 5, wherein the clearances are axially closed in the second position.

7. A method comprising:

moving a first expandable tubular member relative to a second expandable tubular member, such that a pin end of the first expandable tubular member enters and axially overlaps with a box end of the second expandable tubular member;

rotating the first expandable tubular member relative to the second expandable tubular member, such that a first threading on the first expandable tubular member engages with a second threading on the second expandable tubular member;

connecting the first expandable tubular member to the second expandable tubular member in a first position, such that a length of box threading of the box end substantially covers a length of pin threading of the pin end, wherein the pin threading comprises pin crests and pin roots that are substantially axial to the first expandable tubular member, each separated by pin flanks that are substantially radial to the first expandable tubular member and the box threading comprises box crests and box roots that are substantially axial to the second expandable tubular member, each separated by box flanks that are substantially radial to the second expandable tubular member, wherein a first expansion space is formed between load flanks of the pin and box once the first and second expandable tubular members are connected in the first position and a first pin flank and a second pin flank of the pin flanks define a first groove of the first expandable tubular member with a first clearance width, and a third pin flank and a fourth pin flank of the pin flanks define a second groove of the first expandable tubular member with a second clearance width, and the first clearance width and the second clearance width are substantially similar, and wherein the pin crests abut the box roots and the pin roots abut the box crests.

8. The method of claim 7, wherein a second expansion space is formed between stab flanks of the pin and the box.

* * * * *